United States Patent
Ryu et al.

(10) Patent No.: US 9,692,316 B1
(45) Date of Patent: Jun. 27, 2017

(54) BLEEDER METHOD USING SWITCH NODE COUPLING CAPACITOR FOR TRIAC DIMMING OF SOLID STATE LIGHTING

(71) Applicant: Marvell International Ltd., Hamilton (BM)

(72) Inventors: Young Chul Ryu, Cupertino, CA (US); Chang Qian, Palo Alto, CA (US); Wanfeng Zhang, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 82 days.

(21) Appl. No.: 14/330,440

(22) Filed: Jul. 14, 2014

Related U.S. Application Data

(60) Provisional application No. 61/847,972, filed on Jul. 18, 2013.

(51) Int. Cl.
H05B 33/08 (2006.01)
H02M 7/06 (2006.01)

(52) U.S. Cl.
CPC .......... *H02M 7/06* (2013.01); *H05B 33/0815* (2013.01)

(58) Field of Classification Search
None
See application file for complete search history.

(56) References Cited

U.S. PATENT DOCUMENTS

| | | | | |
|---|---|---|---|---|
| 4,933,832 A * | 6/1990 | Schneider | ............... | H02M 1/10 363/143 |
| 8,093,826 B1 * | 1/2012 | Eagar | ................. | H05B 33/0815 315/291 |
| 8,816,597 B2 * | 8/2014 | Suzuki | ............... | H05B 33/0809 315/291 |
| 8,823,283 B2 * | 9/2014 | Kesterson | .............. | H05B 37/02 315/186 |
| 8,937,435 B1 * | 1/2015 | Sutardja | ............. | H05B 33/0815 315/219 |
| 8,988,002 B2 * | 3/2015 | Okubo | ............... | H05B 33/0887 315/291 |
| 9,288,864 B2 * | 3/2016 | Wang | ................. | H05B 33/0848 |
| 9,301,352 B2 * | 3/2016 | Zhu | .................... | H05B 33/0815 |
| 9,374,083 B2 * | 6/2016 | Sawada | .................. | H03K 17/51 |
| 9,408,261 B2 * | 8/2016 | Angeles | ............. | H05B 33/0815 |
| 2003/0198048 A1 * | 10/2003 | Frederick | ................ | F21S 4/001 362/249.01 |
| 2011/0057564 A1 * | 3/2011 | Otake | ................ | H05B 33/0815 315/51 |

(Continued)

Primary Examiner — Crystal L Hammond

(57) ABSTRACT

Power converters having bleeder circuits are disclosed. For example, in an embodiment, a power converter can include a controllable TRIAC in series with a rectifier that together produces a controllable rectified voltage at a first node, a first inductor having a first end and a second end, the first inductor being electrically connected to the first node at the first end, and electrically connected to a first power lead of a transistor and an anode of a diode at the second end, a load capacitor having a first end and a second end, the load capacitor being electrically coupled to the first node at the first end of the load capacitor, and electrically coupled to a cathode of the diode at the second end the load capacitor, control circuitry to control switching of the transistor, and a bleeder circuit coupled to the second end of the inductor, the bleeder circuit including a resistor in series with a coupling capacitor.

5 Claims, 6 Drawing Sheets

(56) References Cited

U.S. PATENT DOCUMENTS

| | | | | |
|---|---|---|---|---|
| 2012/0286663 A1* | 11/2012 | Puvanakijjakorn | H05B 33/0845 | 315/85 |
| 2012/0319610 A1* | 12/2012 | Yoshinaga ......... | H05B 33/0848 | 315/210 |
| 2012/0319621 A1* | 12/2012 | Sutardja ............. | H05B 33/0815 | 315/307 |
| 2013/0020946 A1* | 1/2013 | Boezen .............. | H05B 33/0887 | 315/127 |
| 2013/0057167 A1* | 3/2013 | Angeles ............. | H05B 33/0842 | 315/200 R |
| 2013/0057169 A1* | 3/2013 | Harel ................. | H05B 33/0815 | 315/200 R |
| 2014/0015432 A1* | 1/2014 | Otake ................. | H02M 1/4208 | 315/206 |
| 2014/0265898 A1* | 9/2014 | Del Carmen, Jr. | H05B 33/0815 | 315/200 R |
| 2014/0375223 A1* | 12/2014 | Tao .................... | H05B 33/0815 | 315/186 |

\* cited by examiner ized.
BLEEDER METHOD USING SWITCH NODE COUPLING CAPACITOR FOR TRIAC DIMMING OF SOLID STATE LIGHTING This application claims the benefit of U.S. Provisional Application No. 61/847,972 entitled "New Bleeder Method using Switch Node Coupling Capacitor for Triac Dimming Solid State Lighting" filed on Jul. 18, 2013, the content of which is incorporated herein by reference in its entirety.

BACKGROUND

TRIAC-based power converters work well for high-power applications, such as controllably dimming incandescent light bulbs. However, because Light Emitting Diode (LED) bulbs use a small fraction of the power of incandescent bulbs, TRIAC-based dimmers will incur a variety of performance problems when used with LED-based bulbs. In order to compensate for these problems, bleeder circuits were developed in order to, for example, maintain an appropriate TRIAC holding current necessary to keep the TRIAC in a proper operating state.

SUMMARY

Various aspects and embodiments of the invention are described in further detail below.

In an embodiment, a power converter includes a controllable TRIAC in series with a rectifier that together produce a controllable rectified voltage at a first node, a first inductor having a first end and a second end, the first inductor being electrically connected to the first node at the first end, and electrically connected to a first power lead of a transistor and an anode of a diode at the second end, a load capacitor having a first end and a second end, the load capacitor being electrically coupled to the first node at the first end of the load capacitor, and electrically coupled to a cathode of the diode at the second end the load capacitor, control circuitry to control switching of the transistor, and a bleeder circuit coupled to the second end of the inductor, the bleeder circuit including a resistor in series with a coupling capacitor.

In another embodiment, a power converter includes a controllable TRIAC used to produce a controllable rectified voltage at a first node, a transistor electrically coupled to the first node and used to create a controllable regulated voltage for an electrical load, a bleeder circuit coupled to the transistor, the bleeder circuit including a resistor in series with a coupling capacitor and controllable switch, the controllable switch having an open state and a closed state, wherein when the controllable switch is in a closed state, a first end of the resistor is electrically coupled to ground, and control circuitry configured to control the transistor and the controllable switch.

In yet another embodiment, a power converter includes a controllable TRIAC used to produce a controllable rectified voltage at a first node, a transistor electrically coupled to the first node and used to create a controllable regulated voltage for an electrical load, a bleeder circuit coupled to the transistor, the bleeder circuit including a coupling capacitor electrically connected to the transistor, a resistor in series with the coupling capacitor, and a controllable having an open state and a closed state, wherein when the controllable switch is in a closed state, a first end of the resistor is electrically coupled to ground, and control circuitry configured to control the transistor and the controllable switch.

BRIEF DESCRIPTION OF THE DRAWINGS

Various embodiments of this disclosure that are proposed as examples will be described in detail with reference to the following figures, wherein like numerals reference like elements, and wherein:

FIG. 6 is a power dissipation graph depicting power dissipation curves for the power converters of FIGS. 1 and 4 with the bleeder switch turned on.

DETAILED DESCRIPTION OF EMBODIMENTS

The disclosed methods and systems below may be described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

A TRIAC is a bidirectional switch with specific latch properties. When a TRIAC is triggered, the voltage across the TRIAC has to be high enough to enable a minimum latch current to flow. After the TRIAC is latched, a continuous current of some minimum level must continue to flow through the TRIAC in order to keep the TRIAC in a conducting state. This current is called a "holding current."

In Solid State Lighting (SSL), the power rating is about one-tenth of an incandescent lamp with the same optical output. While the power savings is an obvious benefit, SSL poses a challenge to maintain an appropriate holding current for proper, error-free operation. Bleeder circuits are devices used to compensate for the paucity of current by providing an additional current on the load side of the TRIAC under deep dimming conditions.

A conventional bleeder circuit can consist of nothing more than a resistor between a rectified voltage node and ground. More sophisticated bleeder circuits will include a switch in series with the resistor such that the resistor will only be placed in circuit during deep dimming conditions where an additional current is necessary. The disclosed circuits below both address traditional bleeder functions while addressing power dissipation with only a minimum of added components.

Figure 1:
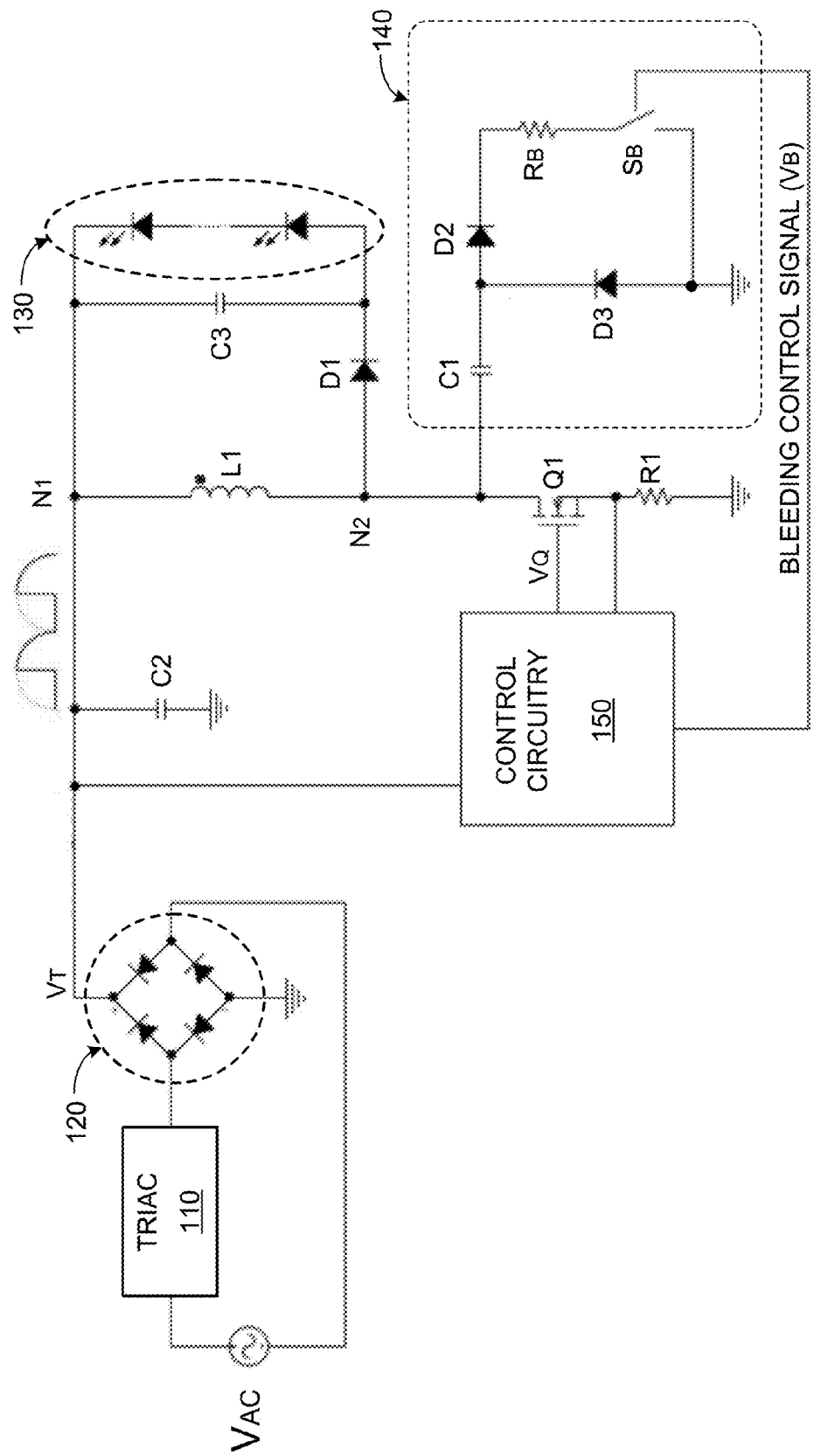
FIG. 1 is an example of a TRIAC-based buck-boost power converter with a modified bleeder circuit.

FIG. 1 is an example of a TRIAC-based buck-boost power converter with modified bleeder functionality. As shown in FIG. 1, the power converter includes a controllable TRIAC 110, a rectifier 120, a load circuit 130, a bleeder circuit 140, control circuitry 150, smoothing capacitors C2 and C3, an inductor L1, Diode D1, a transistor Q1 and a resistor R1. The bleeder circuit 140 includes a coupling capacitor C1, diodes D2 and D3, a bleeder resistor $R_B$ and a bleeder switch $S_B$.

It is to be appreciated that the example control circuitry 150 of FIG. 1 can be a light-emitting diode (LED) driver.

However, the control circuitry 150 of FIG. 1 is to be considered a non-limiting example, and it is to be recognized to those of ordinary skill in the art in light of the present disclosure that the control circuitry 150 can take near limitless forms so long as the basic switch-control and bleeder functionality usable for a power converter is provided.

In operation, alternating current (AC) power is provided to the rectifier 120 through the controllable TRIAC 110. The rectifier 120 uses the AC power to develop a rectified voltage $V_T$ at node N1 that is smoothed by capacitor C2. This portion is to be referred to as the converter's front end. The inductor L1, capacitor C3, the diode D1, the transistor Q1, the resistor R1 and the control circuitry 150 are configured as a buck-boost power converter. That is, the control circuitry 150 causes transistor Q1 to switch on and of fat a desired frequency so as to cause the inductor L1 and diode D1 to develop a working voltage across capacitor C3, which in turn can be used to provide power to a load, such as two or more light-emitting diode (LEDs) placed in series. While the example of FIG. 1 uses a buck-boost topology, it is to be appreciated that any other known or later developed power topology may be employed.

During operation, the bleeder circuit 140 will operate towards two ends: maintaining an appropriate holding current for the controllable TRIAC 110, and managing power dissipation such that transistor Q1 does not overheat by diverting power dissipation to the bleeder resistor $R_B$. Power dissipation can be controlled by selectively closing the bleeder switch $S_B$ based upon the conduction angle of the TRIAC as will be further explained below.

Figure 2A:
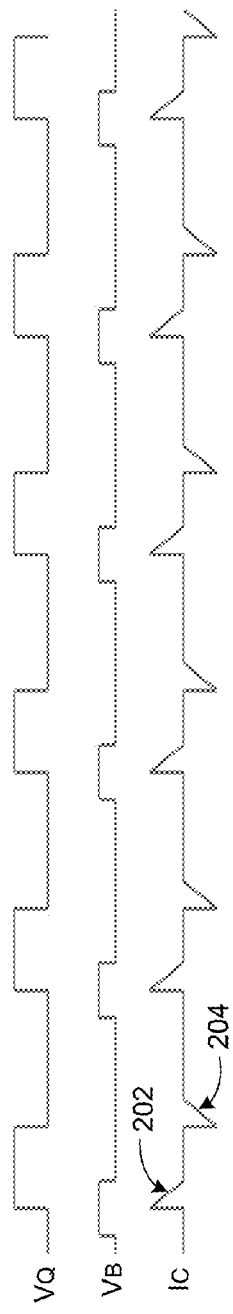
FIGS. 2A-2C depict various scenarios where the modified bleeder circuit of FIG. 1 is controlled so as to control power dissipation.
Figure 2B:
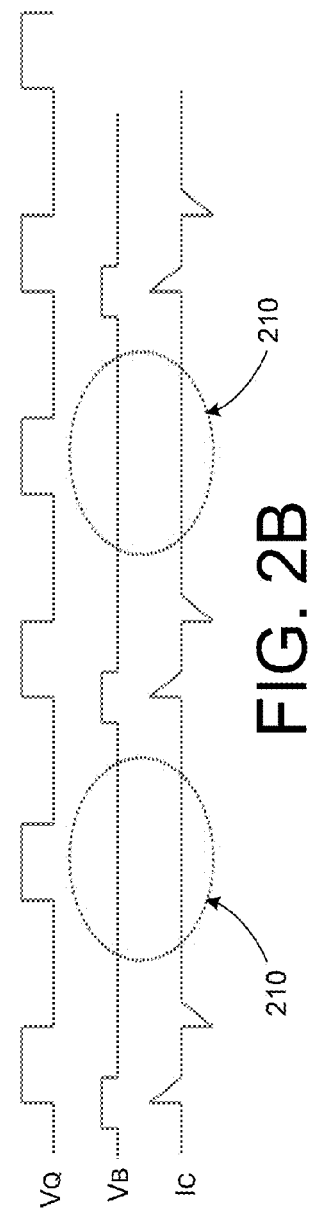
Figure 2C:
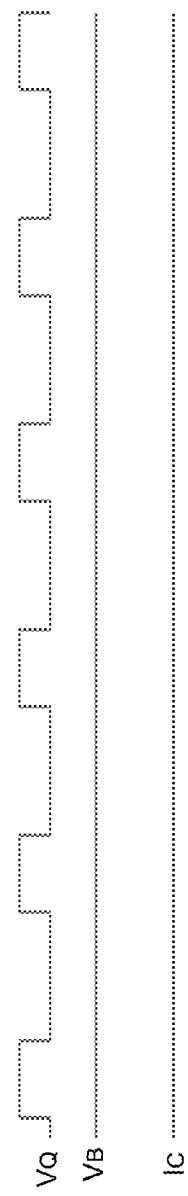

FIGS. 2A-2C depict various scenarios where the modified bleeder circuit 140 of FIG. 1 is controlled under a variety of different TRIAC conduction angles. For each of FIGS. 2A-2C, the control voltage $V_Q$ for transistor Q1, the control voltage $V_B$ for the bleeder switch $S_B$, and the current $I_C$ through the coupling capacitor C1, are presented.

FIG. 2A is an appropriate set of $\{V_Q, V_B, I_C\}$ waveforms for deep dimming conditions. When a TRIAC dimmer is operating under deep dimming conditions (i.e., the TRIAC is operating using a low conduction angle), additional power consumption is required to maintain an appropriate holding current through the TRIAC 110. As this can pose a power a dissipation issue, the bleeder switch $S_B$ can be closed thus causing $I_C$ current spikes 202 and 204 across the coupling capacitor C1. Generally, the waveform of FIG. 2A may be appropriate only when some low conduction angle threshold is reached.

FIG. 2B is an appropriate set of $\{V_Q, V_B, I_C\}$ waveforms for dimming conditions where some power dissipation is appropriate and the TRIAC conduction angle is greater than the TRIAC conduction angle for FIG. 2A. Zones 210 show periods where the bleeder switch $S_B$ is periodically held opened thus causing $I_C$ current spikes to be intermittent. In various embodiments, the ratio of periods when the bleeder switch $S_B$ is periodically opened may be set by a series of discrete thresholds, while in other embodiments the ratio of periods when the bleeder switch $S_B$ is periodically held open may be linear in nature such that, the greater the TRIAC conduction angle, the longer periods 210 will be.

FIG. 2C is an appropriate set of $\{V_Q, V_B, I_C\}$ waveforms for dimming conditions where no additional power dissipation and/or bleeder functionality is required. As shown in FIG. 2C, because the bleeder switch $S_B$ is never activated, current $I_C$ exhibits no spikes.

Figure 3:
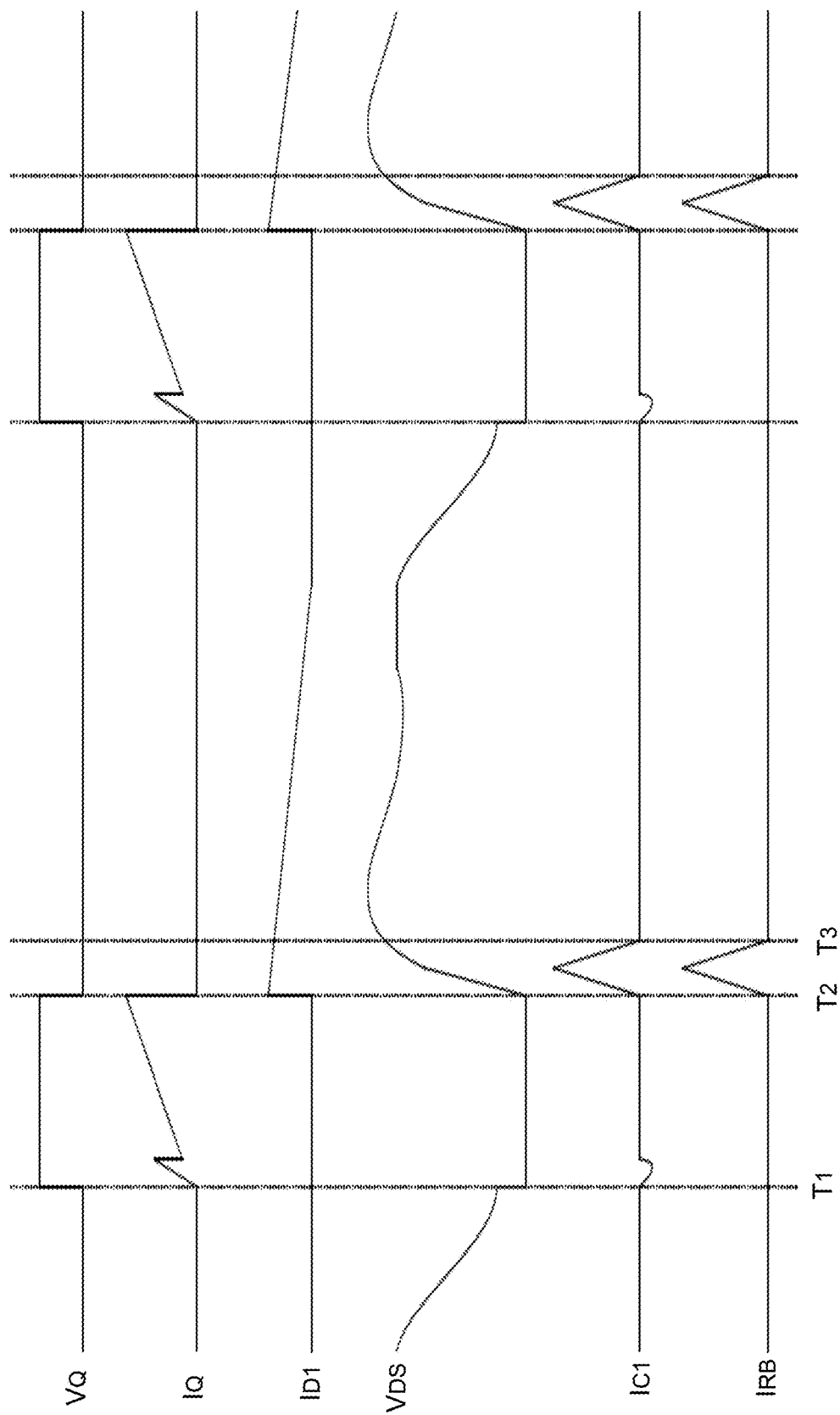
FIG. 3 depicts a variety of voltage and current waveforms for the power converter of FIG. 1.

FIG. 3 depicts a variety of voltage and current waveforms for the power converter of FIG. 1 including the control voltage $V_Q$ for transistor Q1, the current $I_Q$ through transistor Q1, the current $I_{D1}$ through diode D1, the drain-source voltage $V_{DS}$ across transistor Q1, the current $I_{C1}$ through the coupling capacitor C1, and the current $I_{RB}$ through the bleeder resistor $R_B$. Time T1 is the point in time where transistor Q1 is turned on, time T2 is the point in time where transistor Q1 is turned off and bleeder switch $S_B$ is closed, and time T3 denotes the time when the bleeder switch $S_B$ is opened. As shown in FIG. 3, once transistor Q1 turns off, the voltage of its drain quickly rises to the level of the DC Voltage Bus plus LED load voltage. In the period from time T2 to time T3, the coupling capacitor C1 discharges current to the ground of via the bleeder resistor $R_B$ and bleeder switcher $S_B$.

Figure 4:
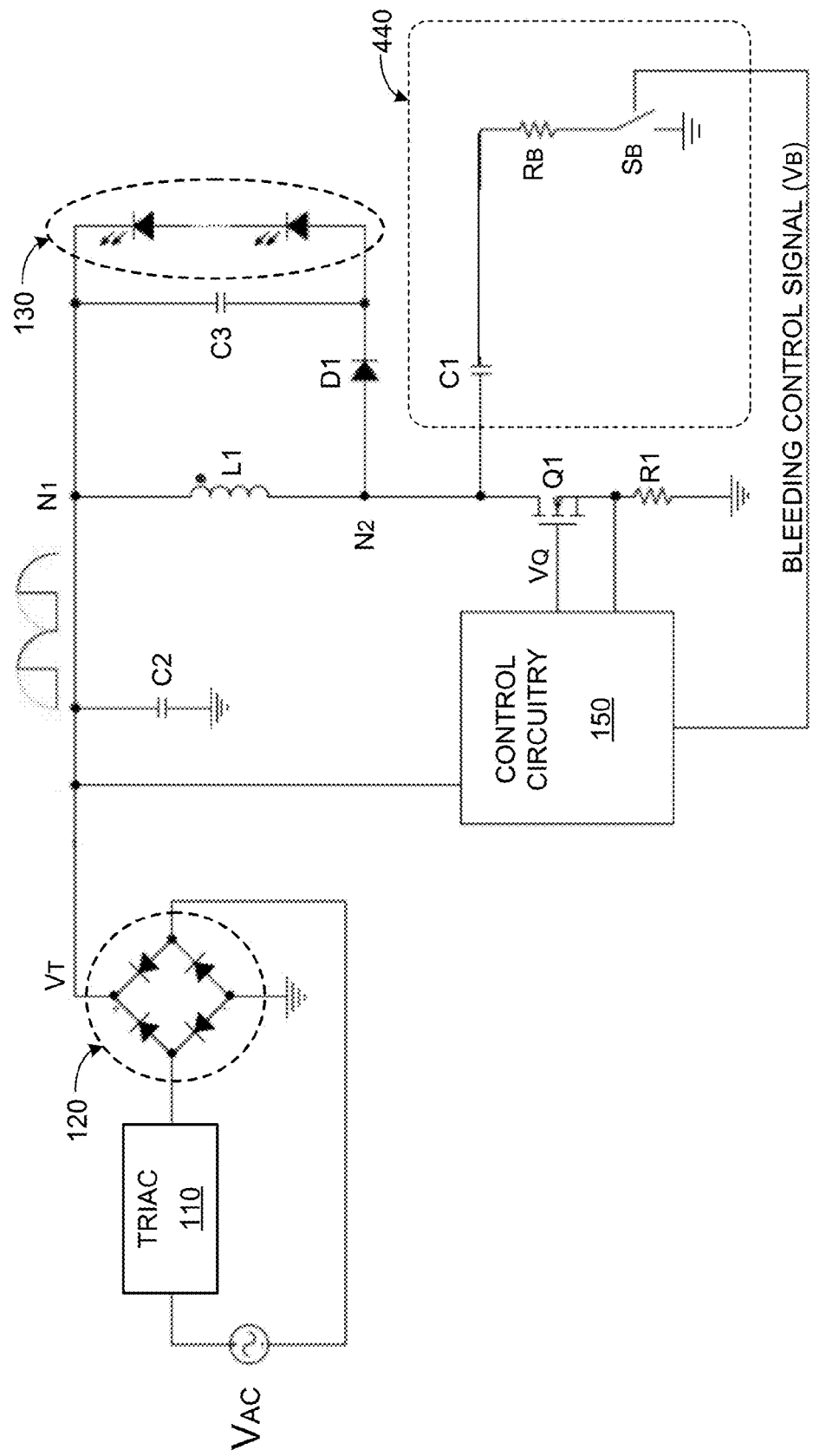
FIG. 4 is a second example of a TRIAC-based buck-boost power converter with a modified bleeder circuit.

FIG. 4 is a second example of a TRIAC-based buck-boost power converter with a modified bleeder circuit. As shown in FIG. 4, the second example power converter is identical to that of FIG. 1 with the exception that the bleeder circuit 140 of FIG. 1 is replaced with bleeder circuit 440. Bleeder circuit 440 includes only the coupling capacitor C1, the bleeder resistor $R_B$ and the bleeder switch SU. Operation of the power converter of FIG. 4 is analogous to that of the power converter of FIG. 1 with the differences being that bleeding power management can be improved through positive and negative cyclic charging of the coupling capacitor C1, and there will be some inadvertent power loss even if the bleeder switch SB is turned off, i.e., no bleeding operation is performed.

Figure 5:
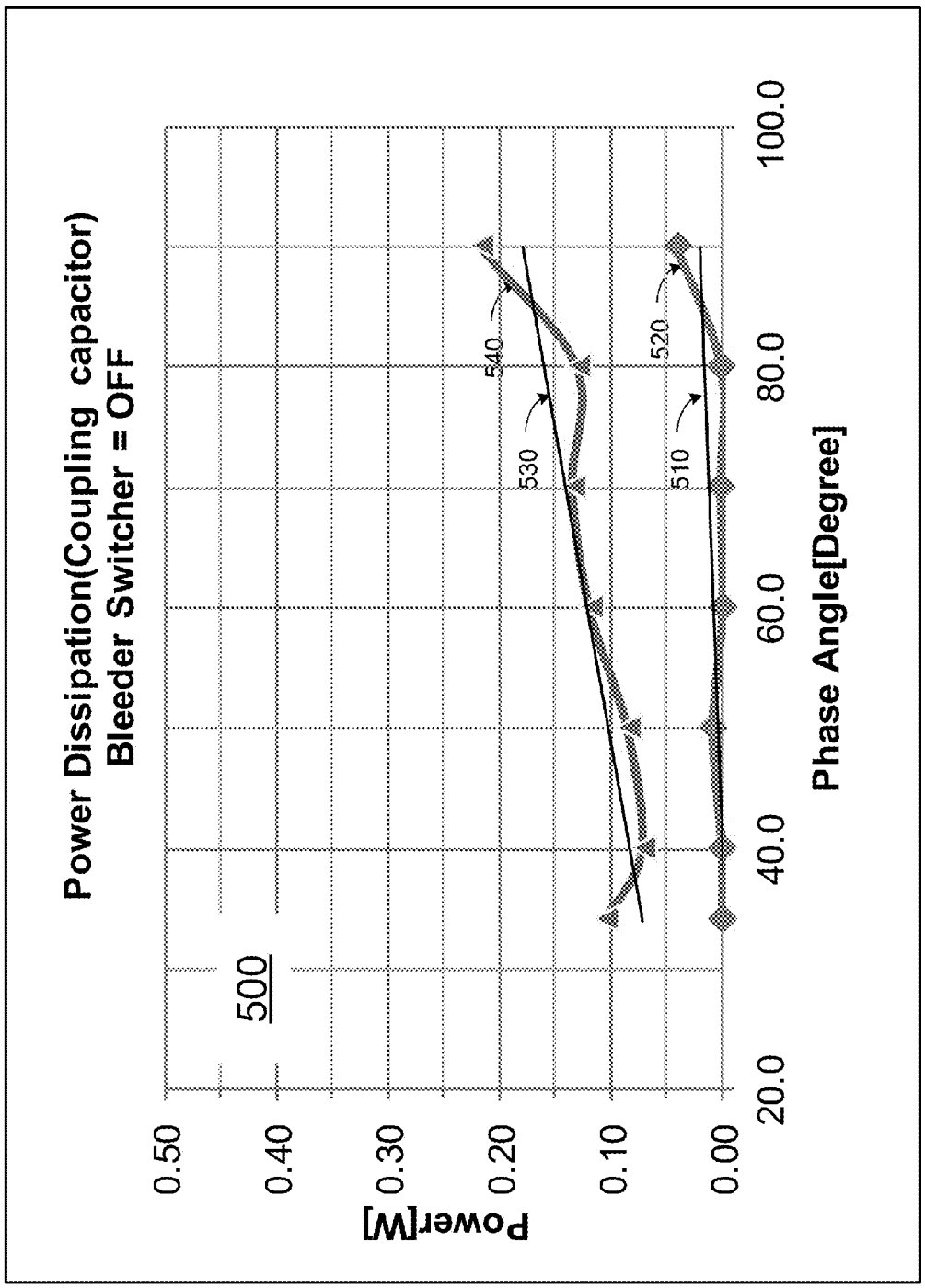
FIG. 5 is a power dissipation graph depicting power dissipation curves for the power converters of FIGS. 1 and 4 with the bleeder switch turned off.

FIG. 5 is a power dissipation graph 500 depicting power dissipation curves for the power converters of FIGS. 1 and 4 with the bleeder switch turned off. As shown in FIG. 5, line 510 depicts an ideal linear power dissipation curve (switch $S_B$ open) for the embodiment of FIG. 1, and line 520 depicts a respective realized circuit performance. Similarly, line 530 depicts an ideal linear power dissipation curve (switch $S_B$ open) for the embodiment of FIG. 4, and line 540 depicts a respective realized circuit performance. FIG. 5 demonstrates that, when no bleeder functionality is required, improved power dissipation performance may be had by adding the diodes D2 and D3 of FIG. 1.

Figure 6:
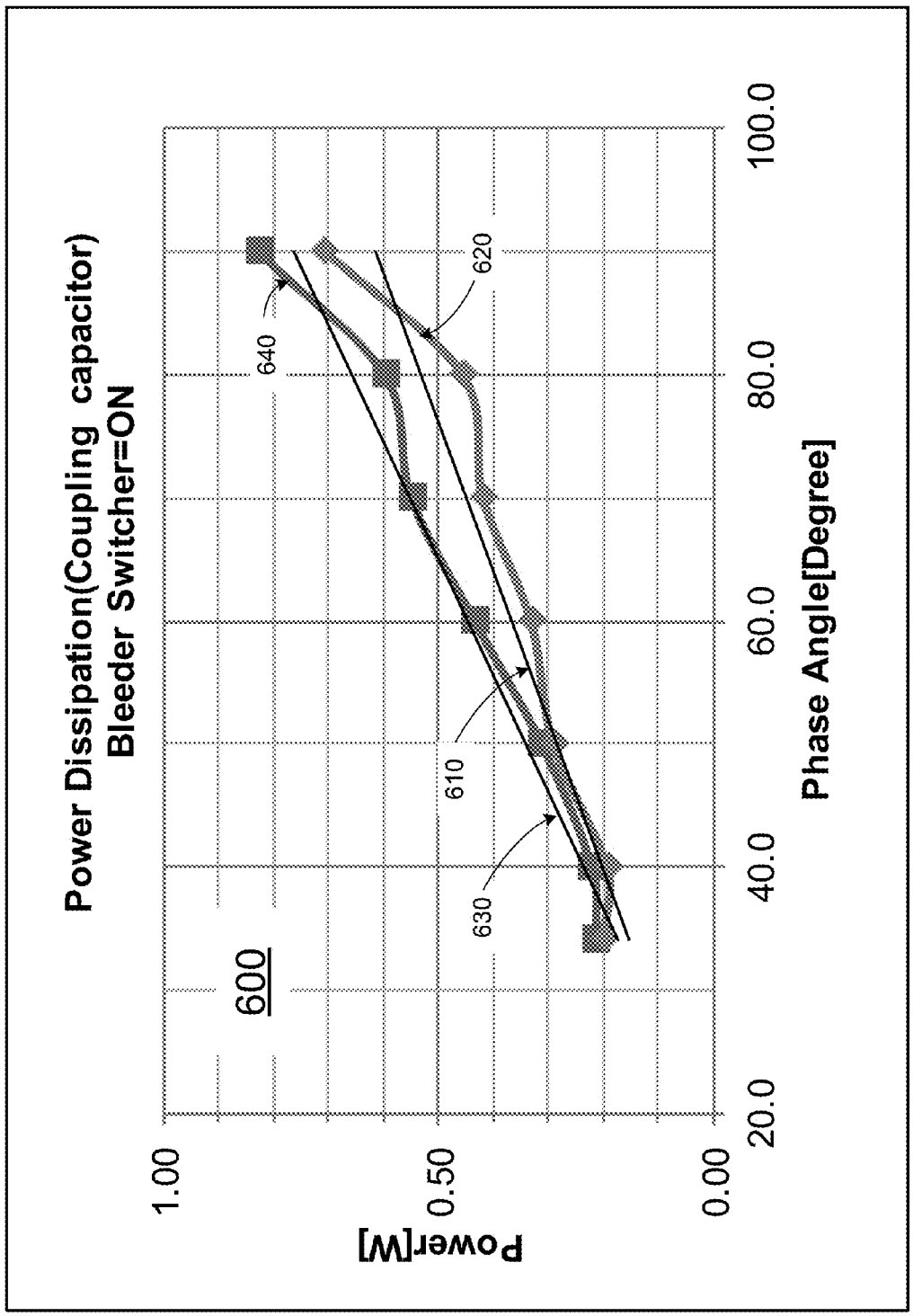

FIG. 6 is a power dissipation graph 600 depicting power dissipation curves for the power converters of FIGS. 1 and 4 with the bleeder switch turned on. As shown in FIG. 6, line 610 depicts an ideal linear power dissipation curve (switch $S_B$ closed) for the embodiment of FIG. 1, and line 620 depicts a respective realized circuit performance. Similarly, line 630 depicts an ideal linear power dissipation curve (switch $S_B$ closed) for the embodiment of FIG. 4, and line 640 depicts a respective realized circuit performance. FIG. 6 demonstrates the slight degradation of performance that occurs in power dissipation (when bleeder functionality is required) when the diodes D2 and D3 of FIG. 1 are added.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A power converter, comprising:
    a power supply front end that produces a rectified voltage at a first node;
    a converter electrically connected to the first node, and electrically connected to a first power lead of a transistor and an anode of a diode at a second end;

a load capacitor having a first end and a second end, the load capacitor being electrically connected to the first node at the first end of the load capacitor, and electrically connected to a cathode of the diode at the second end the load capacitor;

a bleeder circuit coupled to the second end of a first inductor, the bleeder circuit including a bleeder resistor in series with a coupling capacitor; and control circuitry to control switching of the transistor wherein the control circuitry is configured to periodically close a controllable switch only when a conduction angle of the controllable TRIAC is below a threshold so as to divide power consumption between the transistor and the bleeder resistor, wherein the bleeder circuit further includes the controllable switch having an oven state and a closed state and controlled by the control circuitry, wherein when the controllable switch is in a closed state, a first end of the bleeder resistor is electrically coupled to ground, wherein a second end of the bleeder resistor is electrically coupled to the coupling capacitor via a first bleeder diode such that an anode of the first bleeder diode is electrically connected to the bleeder resistor, and a cathode of the first bleeder diode is electrically connected to the coupling capacitor, and wherein the bleeder circuit further includes a second bleeder diode such that an anode of the second bleeder diode is electrically connected to the capacitor and a cathode of the first bleeder diode, and a cathode of the second bleeder diode is electrically connected to ground.

2. The power converter of claim 1, wherein a converter includes a first inductor having a first end and a second end, the first inductor being electrically connected to the first node at the first end, and electrically connected to the first power lead of a transistor and the anode of the diode at the second end.

3. The power converter of claim 1, further comprising a plurality of Light Emitting Diodes (LEDs) arranged in series, the plurality of LEDs being electrically connected to the load capacitor.

4. A power converter, comprising:
a power supply front end that produces a rectified voltage at a first node;
a transistor electrically coupled to the first node and used to create a controllable regulated voltage for an electrical load;
a bleeder circuit coupled to the transistor, the bleeder circuit including a bleeder resistor in series with a coupling capacitor and controllable switch, the controllable switch having an open state and a closed state,
wherein when the controllable switch is in a closed state, a first end of the resistor is electrically coupled to ground; and
control circuitry configured to control the transistor and the controllable switch, wherein the control circuitry is configured to periodically close a controllable switch only when a conduction angle of the controllable TRIAC is below a threshold so as to divide power consumption between the transistor and the bleeder resistor,
wherein a second end of the bleeder resistor is electrically coupled to the coupling capacitor via a first bleeder diode such that an anode of the first bleeder diode is electrically connected to the bleeder resistor, and a cathode of the first bleeder diode is electrically connected to the coupling capacitor, and
wherein the bleeder circuit further includes a second bleeder diode such that an anode of the second bleeder diode is electrically connected to the capacitor and cathode of the first bleeder diode, and a cathode of the second bleeder diode is electrically connected to ground.

5. A power converter method, comprising:
producing a rectified voltage at a first node;
creating a controllable regulated voltage for an electrical load using a transistor electrically coupled to the first node;
applying a bleeder circuit to the transistor, the bleeder circuit including a coupling capacitor electrically connected to the transistor, a bleeder resistor in series with the coupling capacitor, and a controllable switch having an open state and a closed state, wherein when the controllable switch is in a closed state, a first end of the resistor is electrically coupled to ground, and further wherein the controllable switch is driven to periodically close only when the conduction angle of a controllable TRIAC is below a threshold so as to divide power consumption between the transistor and the bleeder resistor
wherein the bleeder circuit further comprises a first bleeder diode and a second bleeder diode, wherein
a second end of the bleeder resistor is electrically coupled to the coupling capacitor via the first bleeder diode such that an anode of the first bleeder diode is electrically connected to the bleeder resistor, and a cathode of the first bleeder diode is electrically connected to the coupling capacitor, and
wherein an anode of the second bleeder diode is electrically connected to the capacitor and cathode of the first bleeder diode, and a cathode of the second bleeder diode is electrically connected to round.

* * * * *